Patented May 5, 1936

2,040,039

UNITED STATES PATENT OFFICE 2,040,039

PHENOLIC MORPHOLINES

Herman A. Bruson, Elkins Park, Pa., assignor to Röhm & Haas Company, Philadelphia, Pa.

No Drawing. Application February 26, 1935, Serial No. 8,301

8 Claims. (Cl. 260—28)

This invention relates to new phenols containing a morpholine group, said phenols having the probable general formula

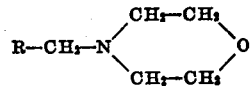

wherein R is a phenolic aromatic nucleus.

These new compounds may be obtained according to the present invention by condensing any phenol having a free reactive nuclear hydrogen atom available for condensation with at least one molecular equivalent each of morpholine and formaldehyde.

Any nuclearly hydroxylated aromatic compound having phenolic properties and a readily replaceable nuclear hydrogen atom can be used. Such bodies are referred to herein broadly as phenols. They can be monohydric or polyhydric phenols, and may contain also other nuclear substituents such as aliphatic, aromatic, or alicyclic hydrocarbon groups, halogen, alkoxy, nitro, amino, acyl, acylamino, alkylol, nitrile, thiocyano or other non-interfering radicals. Acidic groups such as $SO_3H$ interfere with the condensation and must first be neutralized. The term "phenols" as used broadly herein includes also hydroxylated polynuclear aromatic compounds such as the naphthols, hydroxy-anthracenes, hydroxy-quinolines, hydroxy-carbazoles, and other nuclearly hydroxylated aromatics.

Typical common phenols which can be used in this condensation include phenol itself, o-, m-, and p-cresol, 1,3,5-xylenol, resorcinol, alpha or beta-naphthol, o-, m-, or p-phenylphenol, benzylphenol, cyclohexyl-phenol, benzoylphenol, nitrophenol, chlorophenol, 2- or 4-chloro-o-phenylphenol, $\alpha,\alpha,\gamma,\gamma$-tetramethyl-butyl-phenol, $\alpha,\alpha,\gamma,\gamma$-tetramethyl-butyl-resorcinol, thymol, carvacrol, p-tertiary butyl- or amylphenol, bis-(p-hydroxyphenyl)-dimethylmethane, saligenin, guaiacol, catechol, hydroquinone, 8-hydroxyquinoline, p-acetylamino phenol and pyrogallol.

The condensation can be carried out in an inert solvent such as water, alcohol, or dioxane. The formaldehyde used can be gaseous, aqueous, or para-formaldehyde.

The new hydroxy-aralkyl-morpholines obtained are generally crystalline when pure. Some of them are oily, somewhat sticky sirups when crude. They are soluble in both caustic alkalies and in acids such as phosphoric, lactic and acetic with which they form water-soluble salts. Their salts with the higher fatty acids (oleic, stearic, palmitic, linoleic) are soluble in fatty or in mineral oils, or in hydrocarbons.

These new phenolic morpholine derivatives are useful therapeutically and as ingredients of soaps, wetting and emulsifying agents. They may also be used in bactericidal and insecticidal compositions.

In order to illustrate this invention, the following examples are given, but they are not intended as limitations with respect to the phenols used, time, temperature and other conditions of condensation since the invention may otherwise be practised within the scope of the appended claims.

*Example 1*

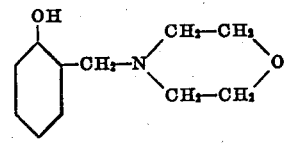

Ninety-four grams phenol (1 mol) was mixed with a solution of 87 grams morpholine (1 mol) in 87 cc. of water. To the clear solution obtained, there was added dropwise while stirring and cooling to 25–35° C., 100 grams of aqueous 30% formaldehyde solution (1 mol HCHO). The mixture was stirred for about three hours during which time an oil separated. After standing at room temperature (25° C.) for 24 hours, the oil was separated from the supernatant aqueous layer and washed several times with hot water. In a few hours it solidified to a crystalline, waxy mass. Upon recrystallization from methanol, the product formed colorless needles melting at 95–96° C.

It is soluble in alcohol, ether, benzene or dilute caustic soda solution. Its hydrochloride, sulfate, phosphate, and lactate are soluble in water.

In the above example, the phenol may be replaced by a molecularly equivalent quantity of any of its nuclear derivatives, such as o-, m-, or p-chlorophenol, bromo-phenol, iodophenol, cresol, or higher alkylated phenols such as thymol, carvacrol, butyl-, amyl or octylphenols, (branched or straight chain), xylenol, nitrophenol, acetylaminophenol, benzoylphenol, or guaiacol to yield the corresponding hydroxy-aralkyl morpholines.

*Example 2*

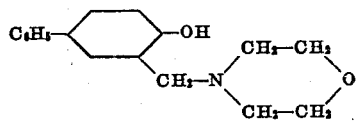

To a mixture of 17 grams p-phenylphenol (0.1 mol), 25 cc. alcohol, 8.7 grams morpholine (0.1 mol) and 9 cc. water, there was added while cooling and stirring, 10 grams of aqueous 30% formaldehyde solution. The mixture was then heated on a steam bath under reflux for 15 minutes. During this period the original suspension cleared up and subsequently a heavy oil separated. The oil was run off and allowed to crystallize. After recrystallization from alcohol, the product formed colorless prisms melting at 88–89° C.

*Example 3*

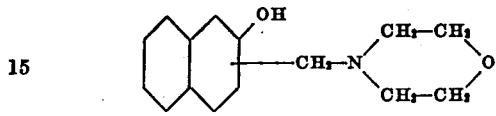

To a mixture of 14.4 grams beta-naphthol, 35 cc. methanol, 9 cc. water and 8.7 grams morpholine, there was added while cooling, 10 grams aqueous 30% formaldehyde solution. In about five minutes, the mixture solidified. It was heated on the steam bath for 15 minutes under reflux to complete the reaction. When cool, the colorless crystalline product was filtered off. After recrystallization from ethyl alcohol, it formed colorless flakes melting at about 115–116° C. It is soluble in dilute aqueous caustic soda solution or in aqueous 10% phosphoric acid solution. The yield was almost quantitative.

*Example 4*

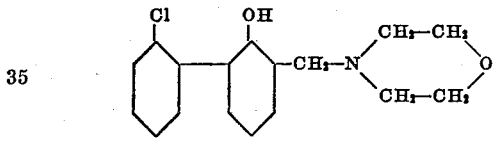

10 grams of aqueous 30% formaldehyde solution was added to a solution of 20.4 grams 2-chloro-o-phenylphenol, 25 cc. methanol, 8.7 grams morpholine and 9 cc. water. The mixture was boiled 15 minutes on a steam bath under reflux, then allowed to stand 18 hours at room temperature (25° C.). The oil which separated was run off and allowed to crystallize. It solidified to a hard crystalline mass which was very difficultly soluble in ethyl alcohol. Upon recrystallization from ethyl alcohol it formed colorless, finely matted needles melting at 155–156° C.

*Example 5*

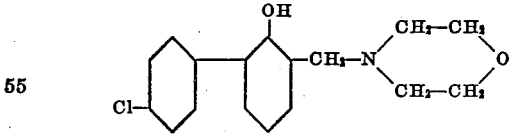

To a solution of 20.4 grams 4-chloro-o-phenylphenol in 25 cc. of methanol, there was added 8.7 grams morpholine in 9 cc. water. While cooling and stirring, 10 grams aqueous 30% formaldehyde solution was added. The mixture was then boiled on a steam bath under reflux for 15 minutes and allowed to stand 48 hours at 25° C. The heavy sticky oil which formed was separated and diluted with 10 cc. methanol to aid crystallization. In a few days it solidified to a hard, colorless, crystalline mass. After repeated recrystallization from methanol, the product formed colorless plateless melting at 125–126° C.

*Example 6.*—To a solution of 11 grams resorcinol (0.1 mol) in 30 cc. methanol and 8.7 grams morpholine (0.1 mol), 10 grams aqueous 30% formaldehyde was added while cooling to 20–25° C. The clear solution obtained after standing in a stoppered flask for ten days at 25° C., began to precipitate fine needles of the reaction product. When recrystallized from ethyl alcohol, it formed colorless needles melting at 207° C.

*Example 7*

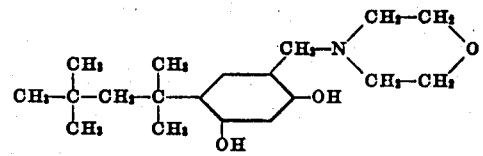

To a solution of 22.2 grams of α,α,γ,γ-tetramethyl-butylresorcinol, 35 cc. methanol, and 8.7 grams morpholine, there was added while cooling and stirring, 10 grams aqueous 30% formaldehyde solution. The clear solution obtained was allowed to stand in a stoppered flask for several days at 25° C. during which time two layers formed. The lower oil layer gradually crystallized. The supernatant liquid layer was removed and 6 cc. methanol added to assist crystallization. After several hours the solid crystalline mass was filtered off and purified by recrystallization from methanol. The product formed colorless crystals melting at 145–146° C.

The product made in the same way from α,α,γ,γ-tetramethylbutylphenol was a colorless oil, which could not be crystallized, but which is readily soluble in aqueous 10% phosphoric acid to give a foamy, soapy solution.

In the above examples, one mol each of the three components have been condensed together. If the phenols used contain two or more free positions ortho to the phenolic hydroxyl groups, it is possible to introduce two or more

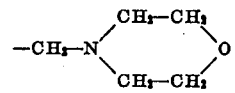

groups into the aromatic nucleus by employing two or more mols each of formaldehyde and morpholine per mol of the phenol.

In the examples given, the phenols used can be replaced mol for mol by any other phenolic body having a replaceable nuclear hydrogen atom. The products derived from phenols or resorcinols having a long chain alkyl substituent such as n-hexylresorcinol, amylphenol, amyl-m-cresol, α,α,γ,γ-tetramethyl-butylresorcinal, and the like, by condensation with formaldehyde and morpholine give water-soluble salts having high phenol coefficients and possessing local anesthetic properties. Their lactates and phosphates, particularly are extremely soluble in water to give foamy soapy solutions of low surface tension.

I claim:—

1. A condensation product of a phenol with at least one molecular equivalent each of formaldehyde and morpholine.

2. A condensation product of a monohydric phenol with at least one molecular equivalent each of formaldehyde and morpholine.

3. A condensation product of a nuclear hydroxylated aromatic compound having phenolic properties with one molecular equivalent each of formaldehyde and morpholine, said condensation product having the general formula

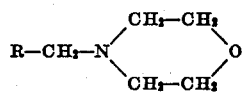

wherein R represents a phenolic aromatic nucleus.

4. A condensation product of phenol, formaldehyde, and morpholine; said condensation product when pure, being a colorless crystalline body melting at about 95–96° C.

5. A condensation product of para-phenylphenol, formaldehyde and morpholine, said condensation product when pure, being a colorless, crystalline body melting at about 88–89° C.

6. A condensation product of beta-naphthol, formaldehyde and morpholine, said condensation product when pure, being a colorless, crystalline body melting at about 115–116° C.

7. A process for preparing a compound having the formula

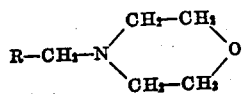

wherein R is a phenolic aromatic nucleus which comprises condensing a phenol having a reactive replaceable nuclear hydrogen atom with at least one molecular equivalent each of formaldehyde and morpholine.

8. The process of introducing at least one group having the formula

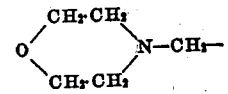

into the aromatic nucleus of a phenol having at least one reactive, replaceable hydrogen atom, which comprises reacting on said phenol with one molecular equivalent each of formaldehyde and morpholine for each such group to be introduced.

HERMAN A. BRUSON.